United States Patent
Yamada

(10) Patent No.: US 10,991,388 B1
(45) Date of Patent: Apr. 27, 2021

(54) SUSPENSION FOR DISK DEVICE HAVING A DAMPER MEMBER FOR SUPPRESSING WOBBLE OF A FLEXURE

(71) Applicant: NHK SPRING CO., LTD., Yokohama (JP)

(72) Inventor: Yukie Yamada, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/073,500

(22) Filed: Oct. 19, 2020

(30) Foreign Application Priority Data

Nov. 14, 2019 (JP) .............................. JP2019-206378

(51) Int. Cl.
  *G11B 5/48* (2006.01)
  *G11B 5/55* (2006.01)
(52) U.S. Cl.
  CPC .......... *G11B 5/4833* (2013.01); *G11B 5/4826* (2013.01); *G11B 5/5582* (2013.01)
(58) Field of Classification Search
  CPC ...... G11B 5/4826; G11B 5/4833; G11B 5/486
  See application file for complete search history.

(56) References Cited

U.S. PATENT DOCUMENTS

| | | | | |
|---|---|---|---|---|
| 5,282,103 A | * | 1/1994 | Hatch ................... | G11B 5/4833 360/244.2 |
| 5,557,488 A | * | 9/1996 | Hamilton .............. | G11B 5/4813 360/234.5 |
| 6,222,706 B1 | * | 4/2001 | Stefansky ............ | G11B 5/5552 360/294.5 |
| 6,967,821 B2 | | 11/2005 | Himes et al. | |
| 9,646,638 B1 | * | 5/2017 | Bjorstrom ............ | G11B 5/4853 |
| 10,748,565 B1 | * | 8/2020 | Nakayama ........... | G11B 5/4826 |
| 2010/0079915 A1 | | 4/2010 | Kido | |
| 2015/0055254 A1 | * | 2/2015 | Bjorstrom ............ | G11B 5/5552 360/294.3 |
| 2015/0243309 A1 | * | 8/2015 | Kido ....................... | G11B 5/48 360/245.9 |
| 2020/0279579 A1 | * | 9/2020 | Nakayama ........... | G11B 5/4833 |
| 2020/0294539 A1 | * | 9/2020 | Aoki ..................... | G11B 5/486 |

FOREIGN PATENT DOCUMENTS

JP  2010086630 A  4/2010

* cited by examiner

*Primary Examiner* — Brian E Miller
(74) *Attorney, Agent, or Firm* — Holtz, Holtz & Volek PC

(57) ABSTRACT

A suspension for a disk device includes a load beam, a flexure and first and second damper members. The load beam includes a first surface, a second surface and first and second openings. The flexure includes first and second outriggers. The first outrigger includes a first branch portion through the first opening, a distal end thereof being interposed between the second surface and the first damper member. The second outrigger includes a second branch portion through the second opening, a distal end thereof being interposed between the second surface and the second damper member.

9 Claims, 12 Drawing Sheets

PRIOR ART

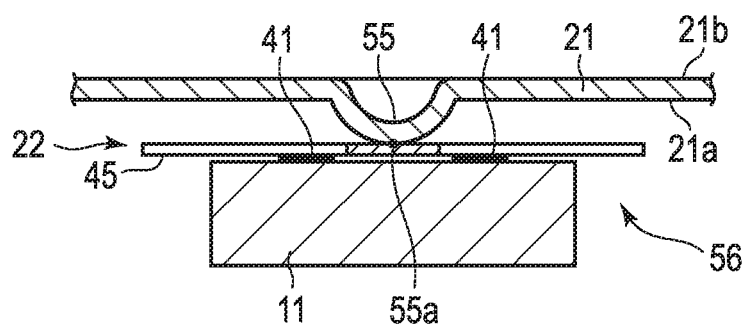
F I G. 6
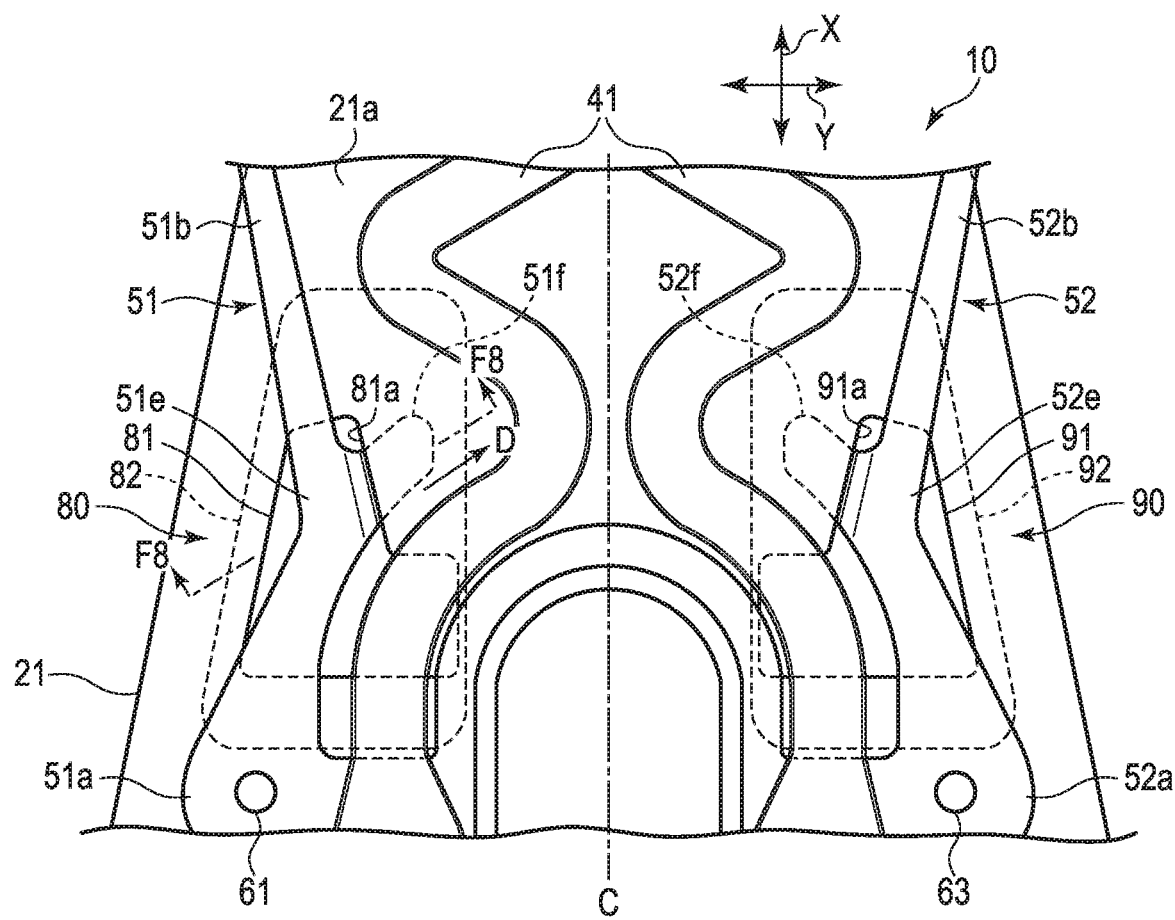
F I G. 7

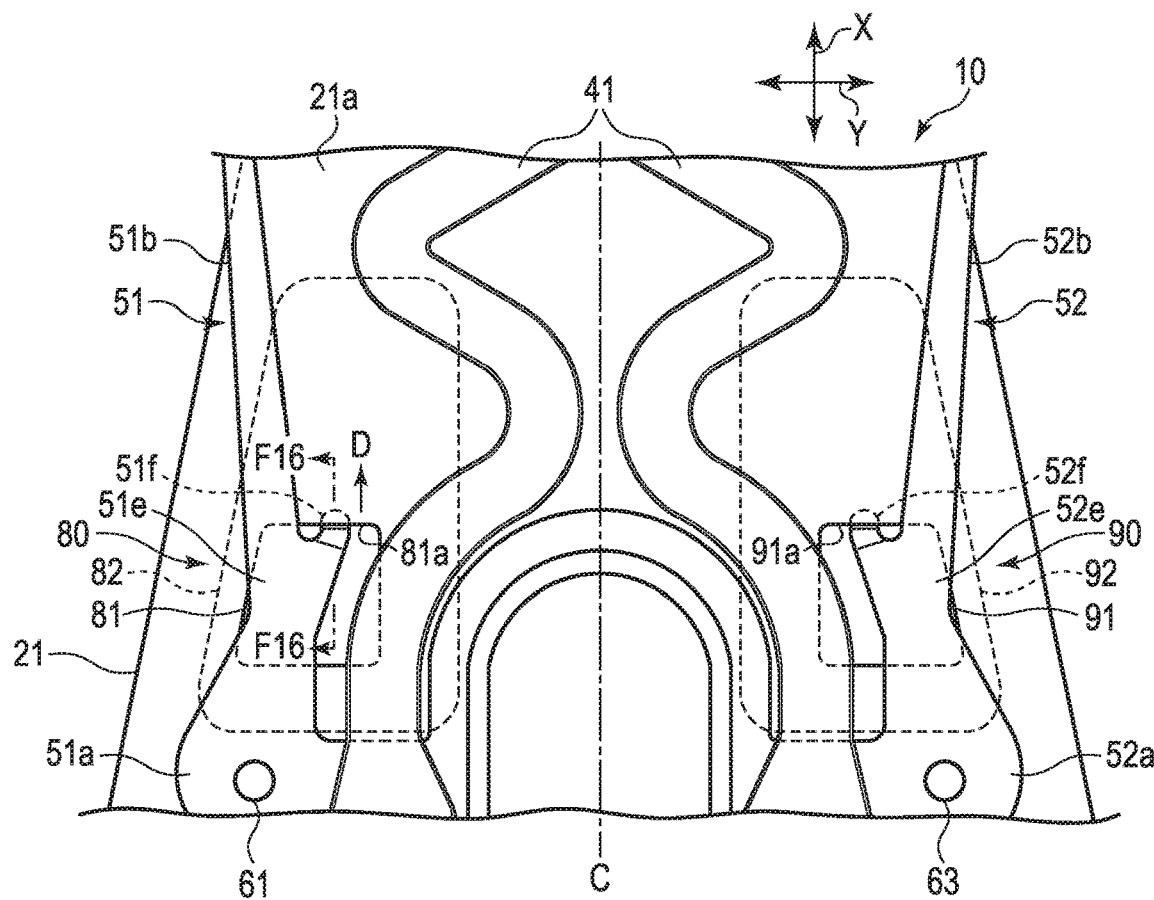
F I G. 15
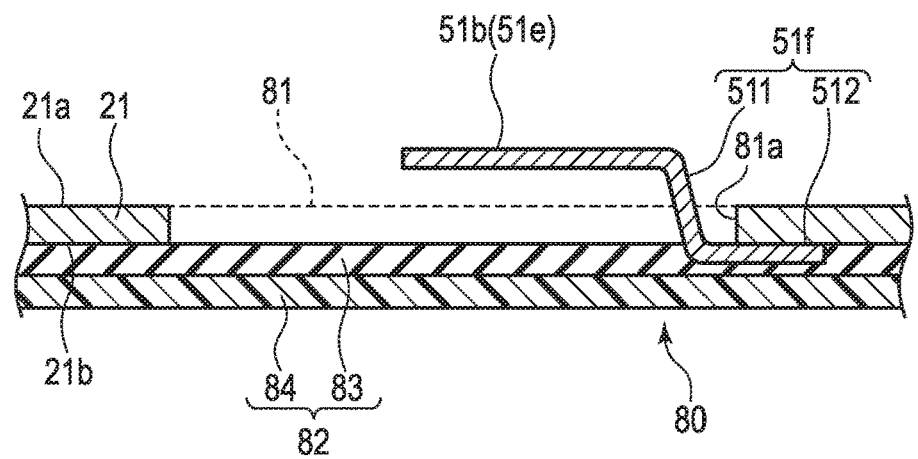
F I G. 16

SUSPENSION FOR DISK DEVICE HAVING A DAMPER MEMBER FOR SUPPRESSING WOBBLE OF A FLEXURE

CROSS-REFERENCE TO RELATED APPLICATIONS

This application is based upon and claims the benefit of priority from prior Japanese Patent Application No. 2019-206378, filed Nov. 14, 2019, the entire contents of which are incorporated herein by reference.

BACKGROUND OF THE INVENTION

1. Field of the Invention

The present invention relates to a suspension for a disk device used for a hard disk drive or the like.

2. Description of the Related Art

Hard disk drives (HDD) are used for data processing devices such as personal computers and the like. Hard disk drives comprise a magnetic disk rotating around a spindle, a carriage pivoting on a pivot shaft, and the like. The carriage includes an actuator arm and pivots in a track width direction of the disk on the pivot shaft by a positioning motor such as a voice coil motor.

A disk-drive suspension (to be referred to merely as a suspension hereinafter) is attached to the actuator arm. The suspension includes a load beam, a flexure disposed to be overlaid on the load beam, and the like. A gimbal portion is formed near a distal end of the flexure, and a slider constituting the magnetic head is provided in the gimbal portion. The slider is provided with an element (transducer) for accessing the disc (e.g., to read or write data, and the like). The load beam, flexure, slider and the like constitute a head gimbal assembly.

The gimbal portion includes a tongue on which the slider is mounted, and a pair of outriggers formed on respective sides of the tongue. The outriggers are each shaped so as to stretch outwards from respective sides of the flexure. Vicinities of both longitudinal ends of each outrigger are fixed to the load beam by, for example, laser welding or the like. Each outrigger can flex in a thickness direction like a spring and plays an important role in securing gimbal movement of the tongue.

In order to provide for a higher recording density of the disk, it is necessary to further downsize the head gimbal assembly and also to become able to position a slider to a recording surface of the disk with high precision. Accordingly, it is necessary to suppress wobbling of the flexure as much as possible while securing the gimbal movement required of the head gimbal assembly. As described in, for example, U.S. Pat. No. 6,967,821 B and JP 2010-86630 A, it is also known that a damper member is provided in a part of the suspension for suppressing the wobbling of the flexure.

For suppressing the wobbling of a flexure, which may occur when a vibration is applied, it is effective to suppress wobbling of the outrigger in some cases. For this reason, it was also conceived that a damper member should be provided in the outrigger itself. More specifically, a damper member is attached to the outrigger and thus the outrigger and the damper member can move together as one body. However, if a damper member is attached to an outrigger, the wobbling of the flexure can be suppressed, but on the other hand, the rigidity of the flexure is increased, which is problematic. For example, a flexure having a damper member extending along a longitudinal direction of the outrigger is not preferable for the gimbal movement because such a flexure exhibits higher rigidities along a pitch direction and also a roll direction as compared to a flexure without a damper member.

BRIEF SUMMARY OF THE INVENTION

One of the objects of the present invention is to provide a suspension for disk device, which can effectively suppress the wobbling of the flexure and can also prevent an increase in the rigidity of the flexure.

According to one embodiment, a suspension for a disk device comprises a load beam, a flexure and first and second damper members. The load beam comprises a first surface, a second surface on an opposite side to the first surface, a first opening and a second opening, which penetrate from the first surface through to the second surface. The flexure comprises a tongue disposed along the first surface, on which a slider is mounted, a first outrigger and a second outrigger disposed on respective outer sides of the tongue along a width direction thereof. The first damper member and the second damper member are attached to the second surface. The first outrigger comprises a first arm disposed on a first surface side, and a first branch portion extending from the first arm through the first opening, a distal end of which is interposed between the second surface and the first damper member. The second outrigger comprises a second arm disposed on the first surface side, and a second branch portion extending from the second arm through the second opening, a distal end of which is interposed between the second surface and the second damper member.

The first damper member may at least partially close the first opening and be attached on the second surface in a periphery of the first opening. The second damper member may at least partially close the second opening and be attached on the second surface in a periphery of the second opening.

The first arm may comprise a first bent portion overlapping the first opening, and the second arm may comprise a second bent portion overlapping the second opening. In this case, the first branch portion may extend from the first bent portion, and the second branch portion may extend from the second bent portion.

The first branch portion and the second branch portion may extend in a direction crossing both a longitudinal direction and a width direction of the load beam. As another example, the first branch portion and the second branch portion may extend parallel to a longitudinal direction of the load beam.

The first outrigger may comprise a pair of first branch portions each identical to the first branch portion, which extend from the first arm in directions different from each other, and the second outrigger may comprise a pair of second branch portions each identical to the second branch portion, which extend from the second arm in directions different from each other.

The first opening may comprise an inner wall including a first protrusion projecting towards the first branch portion put through the first opening, and the second opening may comprise an inner wall including a second protrusion projecting towards the second branch portion put through the second opening.

The first arm may comprise a first arm opening at least partially overlapping the first opening, and the second arm may comprise a second arm opening at least partially overlapping the second opening. In this case, the first branch portion may extend inwards in the first arm opening, and the second branch portion may extend inwards in the second arm opening.

The suspension may further comprise a first insulating layer disposed between the distal end of the first branch portion and the second surface and a second insulating layer disposed between the distal end of the second branch portion and the second surface.

According to a suspension for a disk drive, with such a configuration described above, the wobbling of the flexure which includes the tongue and the pair of outriggers can be effectively suppressed. Further, it is possible to suppress the increase in the rigidity of the flexure, thereby making it possible to avoid adverse effect caused on the gimbal movement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a schematic cross section of the suspension taken along line F6-F6 in FIG. 5.

FIG. 7 is a plan view schematically showing structures of a first damping portion and a second damping portion of the suspension of the first embodiment.

FIG. 15 is a plan view schematically showing a suspension of the fourth embodiment.

FIG. 16 is a schematic cross section of a first damping portion taken along line F16-F16 in FIG. 15.

DETAILED DESCRIPTION OF THE INVENTION

Various embodiments will be described hereinafter with reference to the accompanying drawings.

First Embodiment

Figure 1:
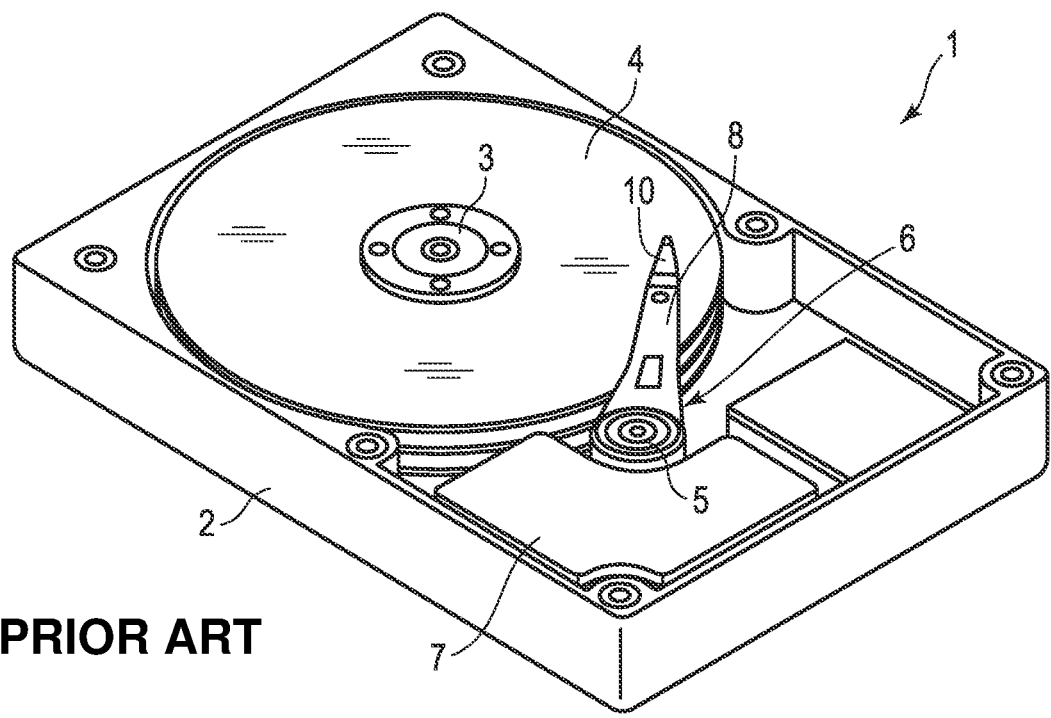
FIG. 1 is a perspective diagram schematically showing an example of a disk device.

FIG. 1 is a perspective view schematically showing an example of a disk device (HDD) 1. The disk device 1 comprises a case 2, a plurality of disks 4 rotating around a spindle 3, a carriage 6 pivotable around a pivot shaft 5, a positioning motor (voice coil motor) 7 for driving the carriage 6. The case 2 is air-tightly sealed by a lid (not shown).

Figure 2:
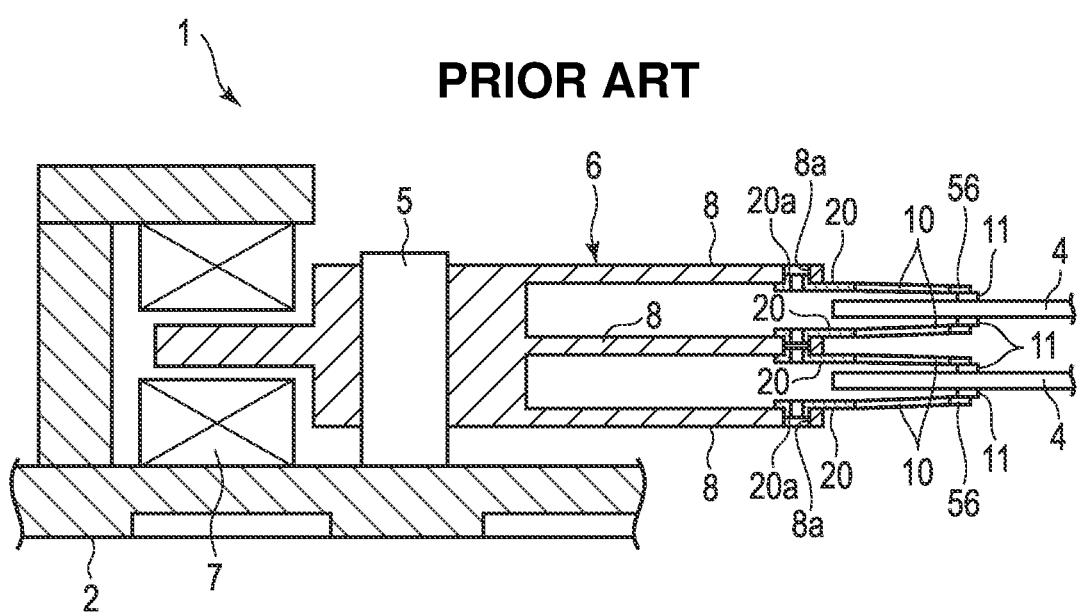
FIG. 2 is a schematic cross section of the disk device shown in FIG. 1.

FIG. 2 is a schematic cross section of a part of the disk device 1. As shown in FIGS. 1 and 2, a plurality of arms (carriage arms) 8 are provided in the carriage 6. Suspensions 10 are respectively attached to distal end portions of the arms 8. Sliders 11, each constituting a magnetic head, are respectively provided in distal end portions of the suspensions 10. When the disks 4 are rotated at high speed, air flows in between each disk 4 and the respective slider 11, thereby creating air bearings.

When the carriage 6 is pivoted by the positioning motor 7, the suspensions 10 move in a diametrical direction of the disks 4, and thus the sliders 11 move to target tracks of the respective disks 4.

Figure 3:
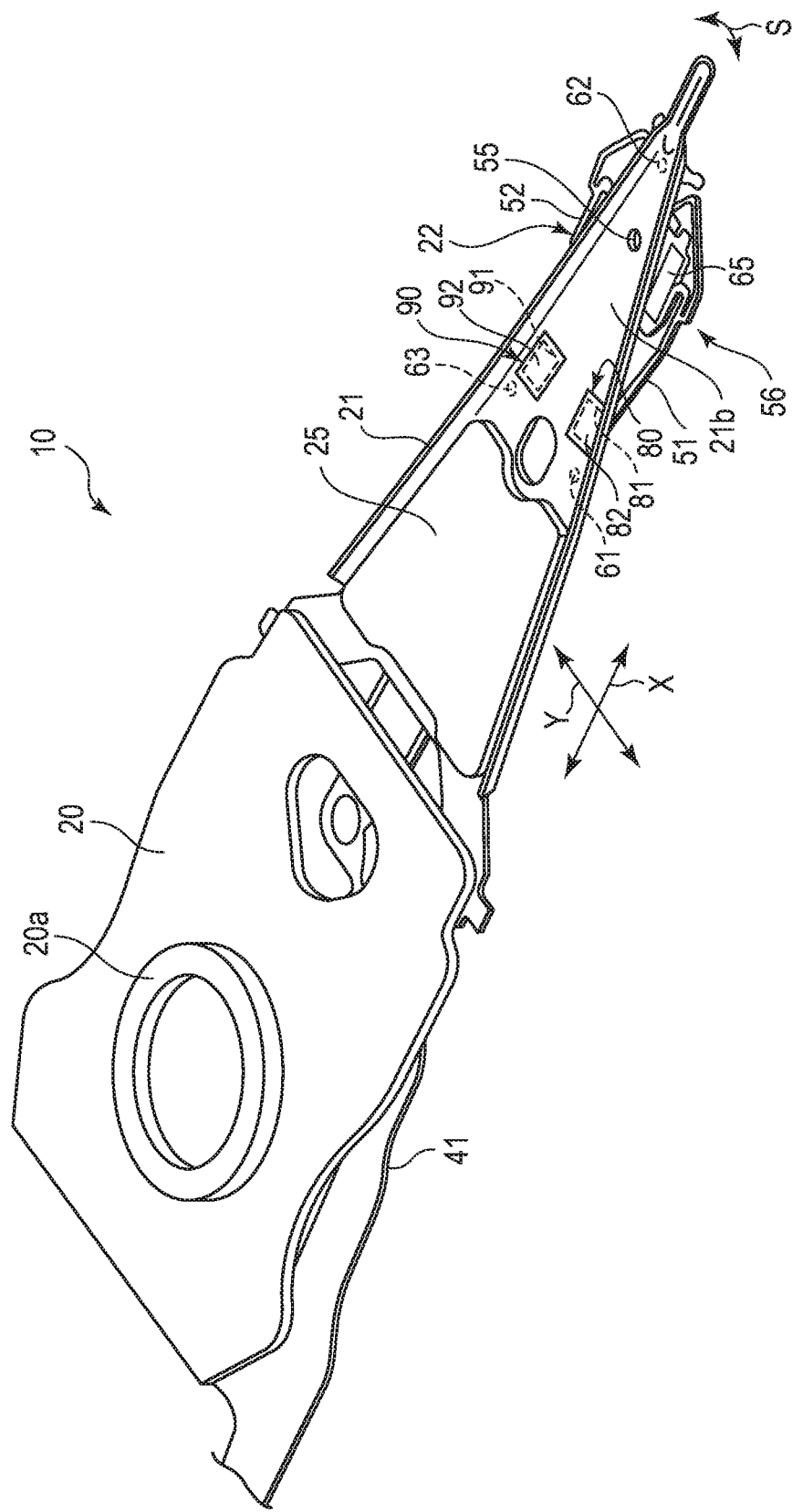
FIG. 3 is a perspective diagram schematically showing a suspension for the disk device of the first embodiment.

FIG. 3 is a perspective view schematically showing a suspension 10 of this embodiment. Each suspension 10 comprises a base plate 20 fixed to the respective arm 8 (shown in FIGS. 1 and 2) of the carriage 6, a load beam 21 and a flexure 22. The base plate 20 comprises a boss portion 20a to be inserted to a hole 8a (shown in FIG. 2) formed in the respective arm 8.

A flexure 22 is disposed along the load beam 21. The load beam 21 and the flexure 22 both extend in a longitudinal direction X of the respective suspension 10. Hereinafter, a direction normal to the longitudinal direction X is referred to as a width direction Y of the suspension 10, the load beam 21, the flexure 22 and the like. Further, a swaying direction S is defined as indicated by an arc-like arrow illustrated near a distal part of the load beam 21.

The load beam 21 includes a first surface 21a (shown in the FIG. 4) and a second surface 21b on an opposite side to the first surface 21a. The first surface 21a is a surface on a side where the flexure 22 is disposed. As shown in FIG. 3, a damper member 25 may be provided in the second surface 21b.

Figure 4:
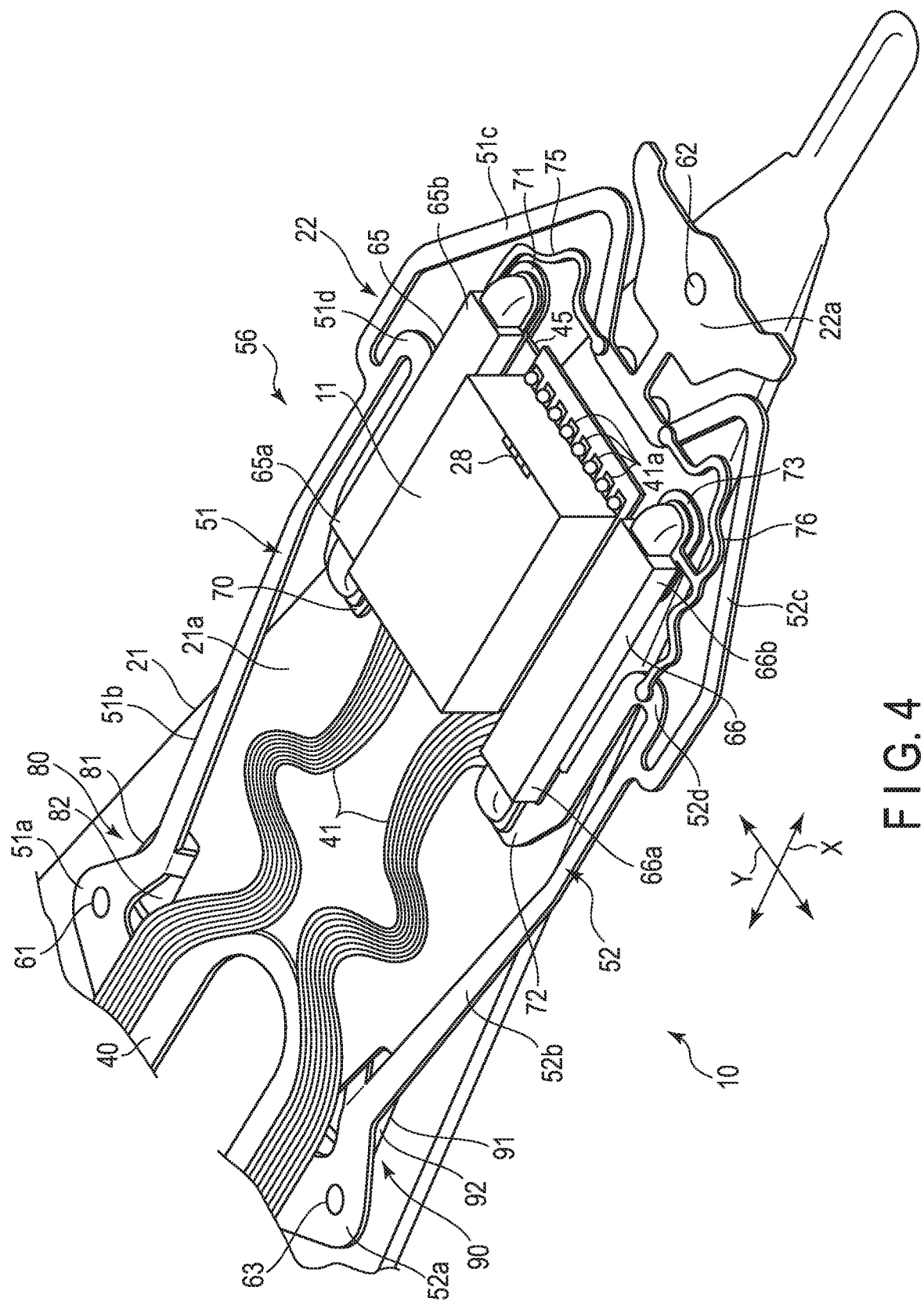
FIG. 4 is a perspective diagram schematically showing the suspension shown in FIG. 3 as viewed from a slider side.

FIG. 4 is a perspective diagram schematically showing a part of the distal end side of the suspension 10 as viewed from a slider 11 side. In the distal end portion of the slider 11 configured as a magnetic head, an element 28 is provided such as an MR element, which can convert a magnetic signal and an electric signal into each other. The element 28 accesses the respective disk 4 so as to write data thereto or read data therefrom, and the like. The slider 11, the load beam 21 and the flexure 22 and the like constitute a head gimbal assembly.

The flexure 22 includes a metal base 40 made from a thin stainless steel plate and a wiring portion 41 disposed along the metal base 40. The thickness of the metal base 40 is less than the thickness of the load beam 21. The thickness of the metal base 40 should preferably be 12 to 25 μm, and for example, 20 μm. The thickness of the load beam 21 is, for example, 30 μm. A part of the wiring portion 41 is electrically connected to the element 28 of the slider 11 via a terminal 41a for the slider 11.

Figure 5:
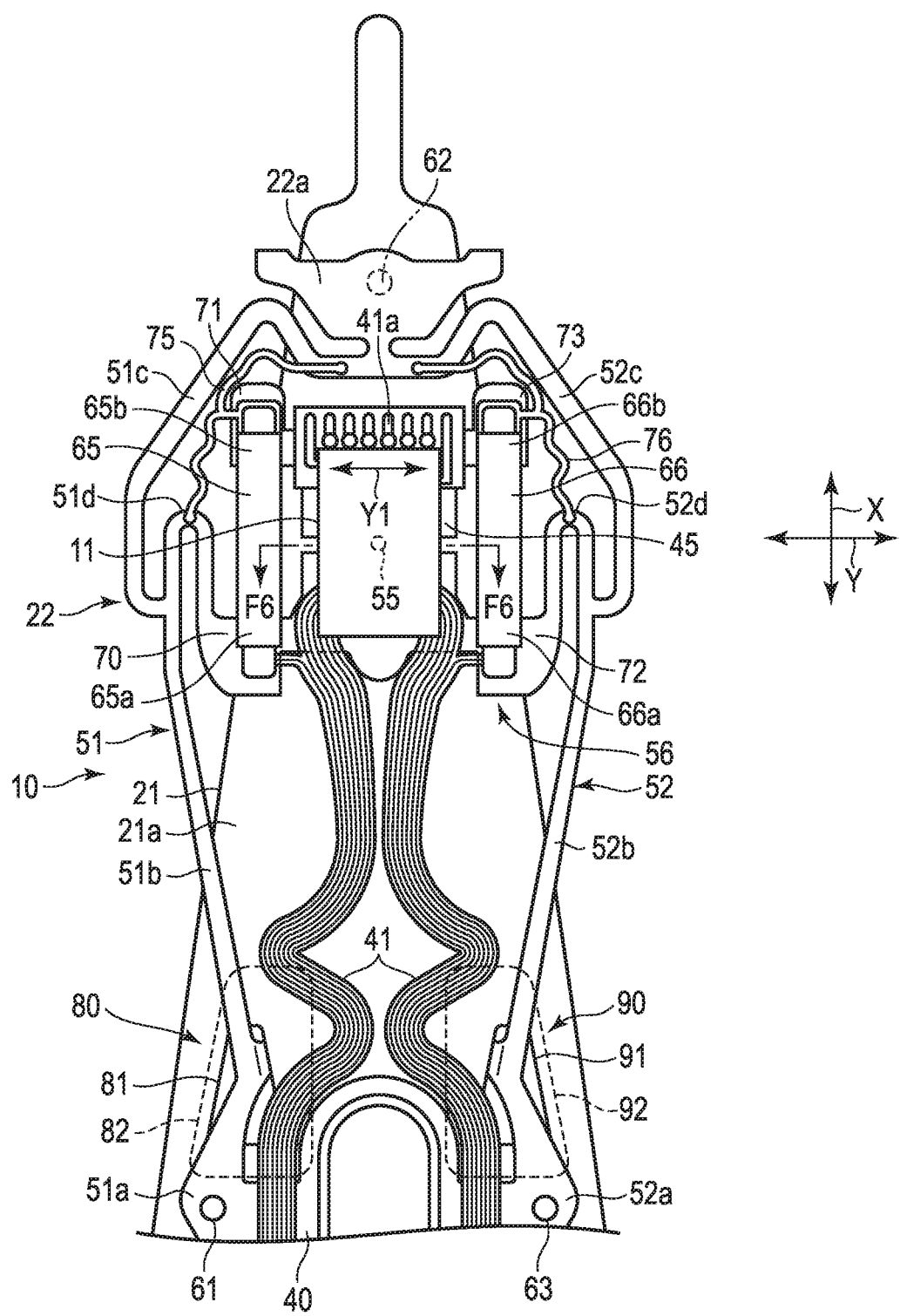
FIG. 5 is a schematic plan view of the suspension shown in FIG. 4.

FIG. 5 is a plan view schematically showing the vicinity of the distal end portion of the suspension 10 as viewed from the slider 11 side. The flexure 22 includes a tongue 45, a first outrigger 51 and a second outrigger 52. On the tongue 45, the slider 11 is mounted. The first outrigger 51 and the second outrigger 52 are disposed in respective sides of the tongue 45 along a width direction Y1. For example, the width direction Y1 coincides with the width direction Y.

The first outrigger 51 and the second outrigger 52 are shaped to protrude on respective sides of the tongue 45 along the width direction Y1 thereof. All of the tongue 45, the first outrigger 51 and the second outrigger 52 are parts of the metal base 40, and the outline of each of these is formed by, for example, etching.

FIG. 6 is a schematic cross section of a suspension 10 taken along line F6-F6 in FIG. 5. A dimple 55 which projects towards the tongue 45 is formed near the distal end of the load beam 21. A distal end 55a of the dimple 55 is in contact with the tongue 45. The tongue 45 swings around the distal end 55a of the dimple 55 and thus can create a desired gimbal movement. The tongue 45, the first outrigger 51, the second outrigger 52, the dimple 55 and the like constitute a gimbal portion 56.

As shown in FIGS. 4 and 5, the first outrigger 51 is disposed on an outer side of a side portion of the tongue 45, so as to extend along the longitudinal direction X of the flexure 22. The second outrigger 52 is disposed on an outer side of the other side portion of the tongue 45 so as to extend along the longitudinal direction X of the flexure 22.

The first outrigger 51 includes a first proximal end portion 51a, a first proximal end-side arm 51b, a first distal end-side arm 51c and a first joint portion 51d. The first proximal end portion 51a is fixed to the load beam 21 with a fixing portion 61. The first proximal end-side arm 51b extends spreads from the first proximal end portion 51a towards the distal end of the flexure 22. An end of the first distal end-side arm 51c is connected to the first proximal end-side arm 51b, and the other end is connected to the distal end portion 22a of the flexure 22. The first joint portion 51d connects the distal end of the first proximal end-side arm 51b and one of the side portions of the tongue 45. The distal end portion 22a is fixed to the vicinity of the distal end of the load beam 21 with a fixing portion 62. The fixing portions 61, 62 are formed by, for example, laser spot welding or the like.

The second outrigger 52 has a shape similar to that of the first outrigger 51. In other words, the second outrigger 52 includes a second proximal end portion 52a, a second proximal end-side arm 52b, a second distal end-side arm 52c and a second joint portion 52d. The second distal end portion 52a is fixed to the load beam 21 with a fixing portion 63, which is formed by, for example, laser spot welding or the like.

As described above, both end portions of the first outrigger 51 along the longitudinal direction X are supported with the fixing portions 61 and 62, respectively. Further, both end portions of the second outrigger 52 along the longitudinal direction X are supported with the fixing portions 62 and 63, respectively. With this structure, a portion located between the fixing portions 61 and 62 of the first outrigger 51 and a portion located between the fixing portions 62 and 63 of the second outrigger 52 can flex in the thickness direction of the metal base 40. Thus, the tongue 45 is supported elastically by the first outrigger 51 and the second outrigger 52, so as to be swung around the dimple 55 as a supporting point.

On the gimbal portion 56, a first micro-actuator element 65 and a second micro-actuator element 66 are mounted. The micro-actuator elements 65 and 66 are each formed from a piezoelectric material and are placed on respective sides of the slider 11. Both end portions 65a and 65b of the first micro-actuator element 65 are fixed to actuator support members 70 and 71 of the tongue 45, respectively. Both end portions 66a and 66b of the second micro-actuator element 66 are fixed to actuator support members 72 and 73 of the tongue 45, respectively.

The micro-actuator elements 65 and 66 each have a function of pivoting the tongue 45 along the swaying direction S (see FIG. 3). In the example shown in FIGS. 4 and 5, a limiter member 75, which inhibits excessive wobbling of the tongue 45, is provided between one side portion of the tongue 45 and the first outrigger 51. Another limiter member 76 is also provided between the other side portion of the tongue 45 and the second outrigger 52.

The suspension 10 of this embodiment comprises a first damping portion 80 and a second damping portion 90, configured to suppress vibration of the flexure 22. The first damping portion 80 is provided in the vicinity of the first proximal end portion 51a of the first outrigger 51, and the second damping portion 90 is provided in the vicinity of the second proximal end portion 52a of the second outrigger 52.

Figure 8:
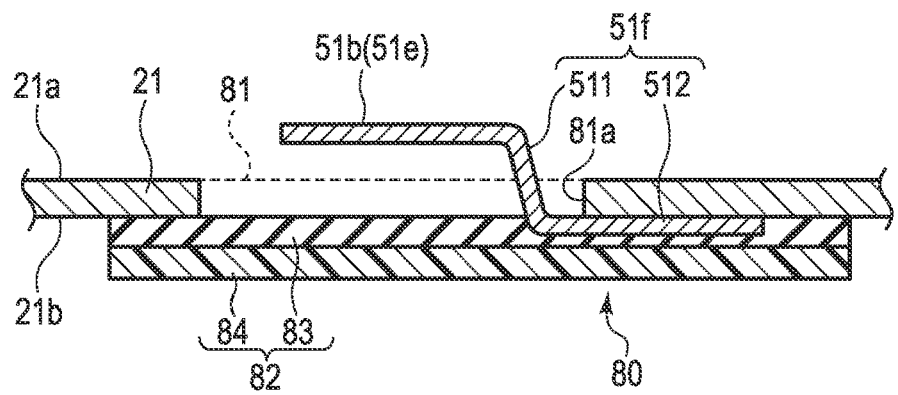
FIG. 8 is a schematic cross section of the first damping portion taken along line F8-F8 in FIG. 7.

FIG. 7 is a plan view schematically illustrating the structure of the suspension 10 in the vicinities of the first damping portion 80 and the second damping portion 90. FIG. 8 is a schematic cross section of the first damping portion 80 taken along line F8-F8 in FIG. 7.

As shown in FIG. 7, the load beam 21 comprises a first opening 81 in the vicinity of the first proximal end portion 51a. A part of the first proximal end-side arm 51b overlaps the first opening 81. Further, the first proximal end-side arm 51b comprises a first bent portion 51e in a position which overlaps the first opening 81. Between the first proximal end portion 51a and the first bent portion 51e, the first proximal end-side arm 51b extends in a direction approaching the center C along the width direction Y of the suspension 10. On the other hand, between the first bent portion 51e and the first distal end-side arm 51c, the first proximal end-side arm 51b extends in a direction away from the center C (see FIG. 5).

Further, the first proximal end-side arm 51b comprises a first branch portion 51f in the vicinity of the first bent portion 51e. The first branch portion 51f is inserted through the first opening 81. The first opening 81 is closed with a first damper member 82 attached to a second surface 21b of the load beam 21. The first damper member 82 may only partially close the first opening 81. The first damping portion 80 is constituted by the first opening 81, the first damper member 82 and the first branch portion 51f.

In the example shown in FIG. 7, the first branch portion 51f extends towards the center C along an extending direction D which crosses both the longitudinal direction X and the width direction Y. The first opening 81 comprises an inner wall 81a which extends along a direction which crosses each of the longitudinal direction X, the width direction Y and the extending direction D. The first branch portion 51*f* overlaps the inner wall 81*a*.

The load beam 21 comprises a second opening 91 in the vicinity of the second proximal end portion 52*a*. The second opening 91 is closed by a second damper member 92 attached to the second surface 21*b* of the load beam 21. The second damper member 92 may only partially close the second opening 91. Further, the second proximal end-side arm 52*b* includes a second bent portion 52*e* and a second branch portion 52*f*. The second branch portion 52*f* is inserted through the second opening 91. The second damping portion 90 is constituted by the second opening 91, the second damper member 92 and the second branch portion 52*f*.

In the example shown in FIG. 7, the second proximal end-side arm 52*b*, the second opening 91 and the second damper member 92 each have a line-symmetrical shape to that of the first proximal end-side arm 51*b*, the first opening 81 and the first damper member 82 with respect to the center C.

As shown in FIG. 8, the first proximal end-side arm 51*b* (the first bent portion 51*e*) is parallel to the first surface 21*a* of the load beam 21. The first branch portion 51*f* includes a ramp portion 511 inclined to the first proximal end-side arm 51*b* and a flat portion 512 parallel to the second surface 21*b* of the load beam 21. The ramp portion 511 is inserted through the first opening 81 in the vicinity of the inner wall 81*a*. The flat portion 512 is in contact with the second surface 21*b*.

The first damper member 82 comprises a viscoelastic material layer 83 and a constrained plate 84. The viscoelastic material layer 83 is formed of a high polymer material (for example, acrylic resin) which can exhibit viscous resistance when deformed, and is adhesive. The thickness of the viscoelastic material layer 83 is, for example, 51 μm. The constrained plate 84 is formed of a synthetic resin such as polyester, and is laminated on the viscoelastic material layer 83. The thickness of the constrained plate 84 is, for example, 51 μm.

The first damper member 82 is attached to the second surface 21*b* with the viscoelastic material layer 83, in the surroundings of the first opening 81. The distal end of the first branch portion 51*f*, that is, the flat portion 512, is interposed between the second surface 21*b* and the first damper member 82. More specifically, the viscoelastic material layer 83 is attached to a lower portion of the surface of the flat portion 512, as shown in FIG. 8, and an upper surface of the surface of the flat portion 512, as shown in FIG. 8, is pushed to the second surface 21*b*.

The cross-sectional structure of the second damping portion 90 is similar to the cross-sectional structure of the first damping portion 80 shown in FIG. 8. That is, the second damper member 92 comprises a viscoelastic material layer and a constrained plate, and the second branch portion 52*f* includes a ramp portion and a flat portion interposed between the second surface 21*b* and the second damper member 92.

In the example shown in FIG. 7, note that the first opening 81 has such a shape that the inner wall 81*a* protrudes inwards in the first opening 81. Similarly, the second opening 91 has such a shape that the inner wall 91*a* opposing the second branch portion 52*f* protrudes inwards in the second opening 91. Such shapes of the openings 81 and 91 are effective when attaching the flexure 22 to the load beam 21 in the production of the suspension 10. More specifically, here, the first branch portion 51*f* is inserted to a wide region located below the inner wall 81 in FIG. 7, and further, the second branch portion 52*f* is inserted to a wide region located below the inner wall 91*a*, and while maintaining this state, the flexure 22 is slid upwards in FIG. 7. Thus, each of the branch portions 51*f* and 52*f* can be positioned at the locations indicated in FIG. 7.

The operation of the suspension 10 according to this embodiment will now be described.

When the carriage 6 (shown in FIGS. 1 and 2) is pivoted by the positioning motor 7, the suspension 10 moves in the diametrical direction of the disks 4, and thus the slider 11 of the respective magnetic head moves to a target track of the recording surface of the respective disk 4. When voltage is applied to the micro-actuator elements 65 and 66, the elements 65 and 66 are deformed according to the voltage, and thus the load beam 21 can be moved by a slight amount in the swaying direction S (shown in FIG. 3).

The suspension 10 of this embodiment comprises the damping portions 80 and 90 in the vicinities (proximal end portions) of the proximal end portions 51*a* and 52*a* of the pair of outriggers 51 and 52, respectively. When energy which can vibrate the flexure 22 is applied from outside, the viscoelastic material layers 83 of the damper members 82 and 92 of the respective damping portions 80 and 90 deform, thus producing internal resistance due to friction of the molecules constituting the viscoelastic material layers 83. Therefore, the vibration energy is converted into thermal energy, thus making it possible to suppress the wobbling of the flexure 22.

Figure 9:
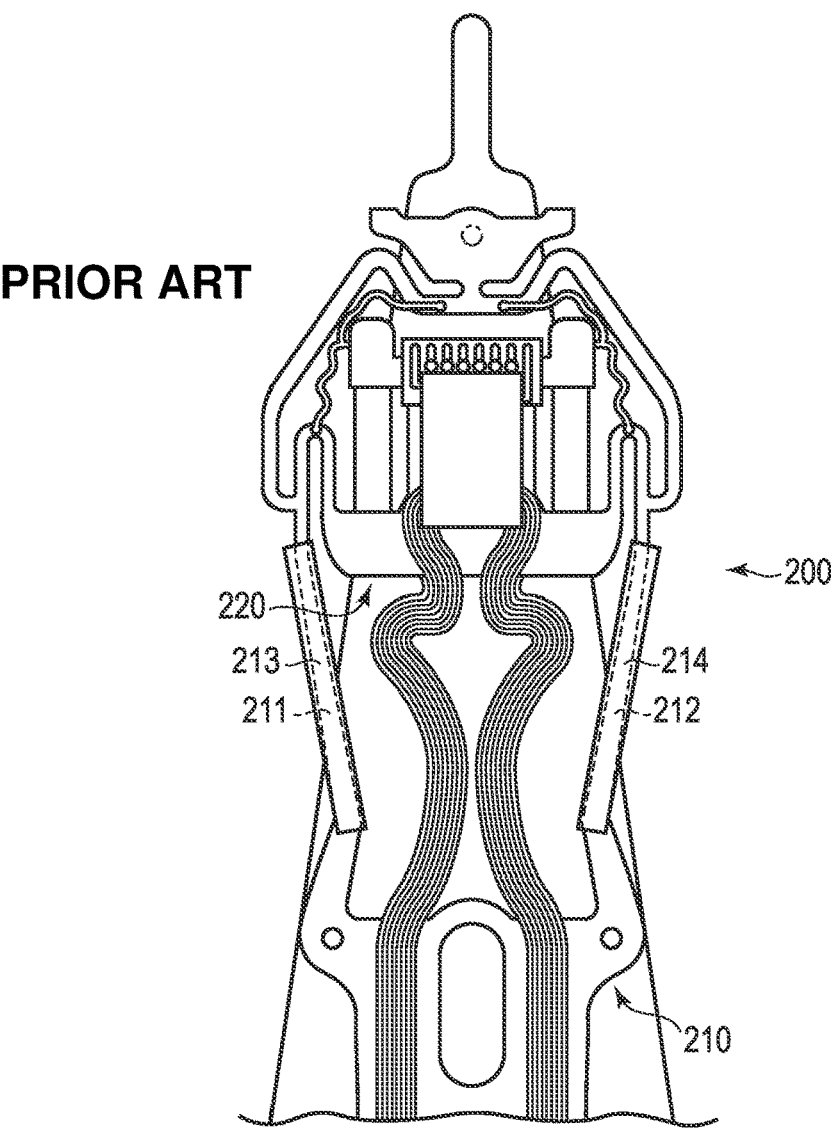
FIG. 9 is a plan view schematically showing a suspension of a comparative example.

Here, an advantageous effect of the suspension 10 of this embodiment will be further described with reference to a comparative example. FIG. 9 is a plan view schematically showing a suspension 200 of the comparative example. As in the case of the example, the suspension 200 comprises a flexure 210 including a first outrigger 211 and a second outrigger 212, and a gimbal portion 220.

Further, a first damper member 213 is provided in the first outrigger 211, and a second damper member 214 is provided in the second outrigger 212. The damper members 213 and 214 are adhered only to the outriggers 211 and 212, respectively, and extend in the longitudinal directions of the outriggers 211 and 212, respectively.

With the suspension 200 of such a configuration as well, the wobbling of the gimbal portion 220 can be suppressed. However, as will be described below, the rigidity of the flexure is increased in comparison with a suspension without damper members 213 and 214.

Figure 10:
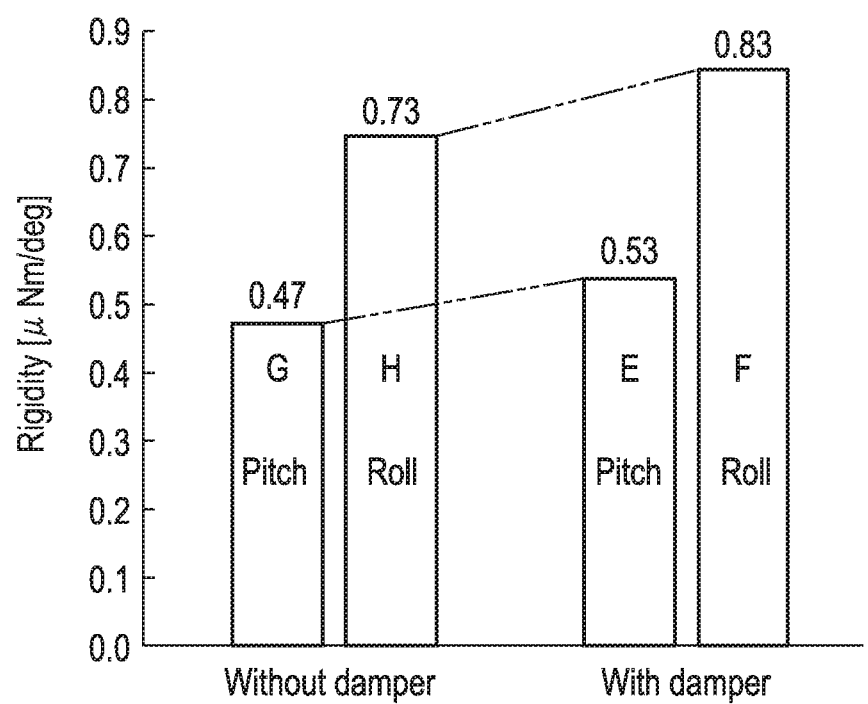
FIG. 10 is a diagram illustrating the rigidity of the flexure in each of a suspension with a damper member and a suspension without a damper member.

FIG. 10 is a graph showing the rigidity of the flexure regarding each of the suspension 200 with the damper members 213 and 214 as shown in FIG. 9 and a suspension without damper members. In FIG. 10, reference symbols E and F respectively show the rigidities of the suspension 200 along the pitch direction and the roll direction in the comparative example shown in FIG. 9. In FIG. 10, reference symbols G and H respectively show the rigidities of the suspension without the damper member 213 and 214 along the pitch direction and the roll direction.

As can be seen from the graph, the rigidities E and F of the flexure in the suspension 200 with the damper members 213 and 214 are both increased by approximately 13% as compared to the case without the damper members 213 and 214. If the rigidity increases to this extent, an adverse effect may be created in the gimbal movement of the suspension 200.

On the other hand, in the suspension 10 of this embodiment, the branch portions 51*f* and 52*f* of the outriggers 51 and 52 are bent to a second surface 21*b* side of the load beam 21 via the openings 81 and 91, and are fixed to the load beam 21 by the damper members 82 and 92. With this configuration, the proximal end-side arms 51*b* and 52*b* located on a first surface 21*a* side of the load beam 21 and the distal end-side arms 51*c* and 52*c* are not directly constrained by the damper members 82 and 92; therefore, influence on the rigidity of the outriggers 51 and 52, which may be caused by the damper members 82 and 92, can be suppressed.

Further, the branch portions 51*f* and 52*f* bent to the second surface 21*b* side are parts branched off from the proximal end-side arms 51*b* and 52*b*, and therefore an influence on the function of the outriggers 51 and 52, which may be caused by the bending, can be also suppressed.

Furthermore, with such a structure that the branch portions 51*f* and 52*f* are interposed between the load beam 21 and the damper members 82 and 92, the branch portions 51*f* and 52*f* are held well. Thus, the effect of damping the vibration can be further stabilized.

Note that, in the suspension 200 of the comparative example shown in FIG. 9, the damper members 213 and 214 greatly extend in the longitudinal directions of the outriggers 211 and 212, respectively. The damper members 213 and 214 oppose a surface of the load beam, on the side where the flexure 210 is disposed (that is, a surface corresponding to the first surface 21*a* in the embodiment). When a shipping comb, which is used when installing the suspension 200 in a disk device, is brought into contact with the respective surface of the load beam, the shipping comb may interfere with the damper member 213 and 214 to cause damage to the damper members 213 and 214. On the other hand, in the suspension 10 of the embodiment, the damper members 82 and 92 are provided on the second surface 21*b* of the load beam 21. With this configuration, the interference between the shipping comb and the damper members 82 and 92 can be suppressed.

In addition to the above, various preferable advantages can be obtained from this embodiment.

The structure of the damping portions 80 and 90 disclosed in this embodiment is only an example. The second to sixth embodiments, which will be provided, discuss other structures applicable to the damping portions 80 and 90 as examples. For the parts which are not particularly mentioned in each of the following embodiments, a structure similar to that the first embodiment can be applied.

Second Embodiment

Figure 11:
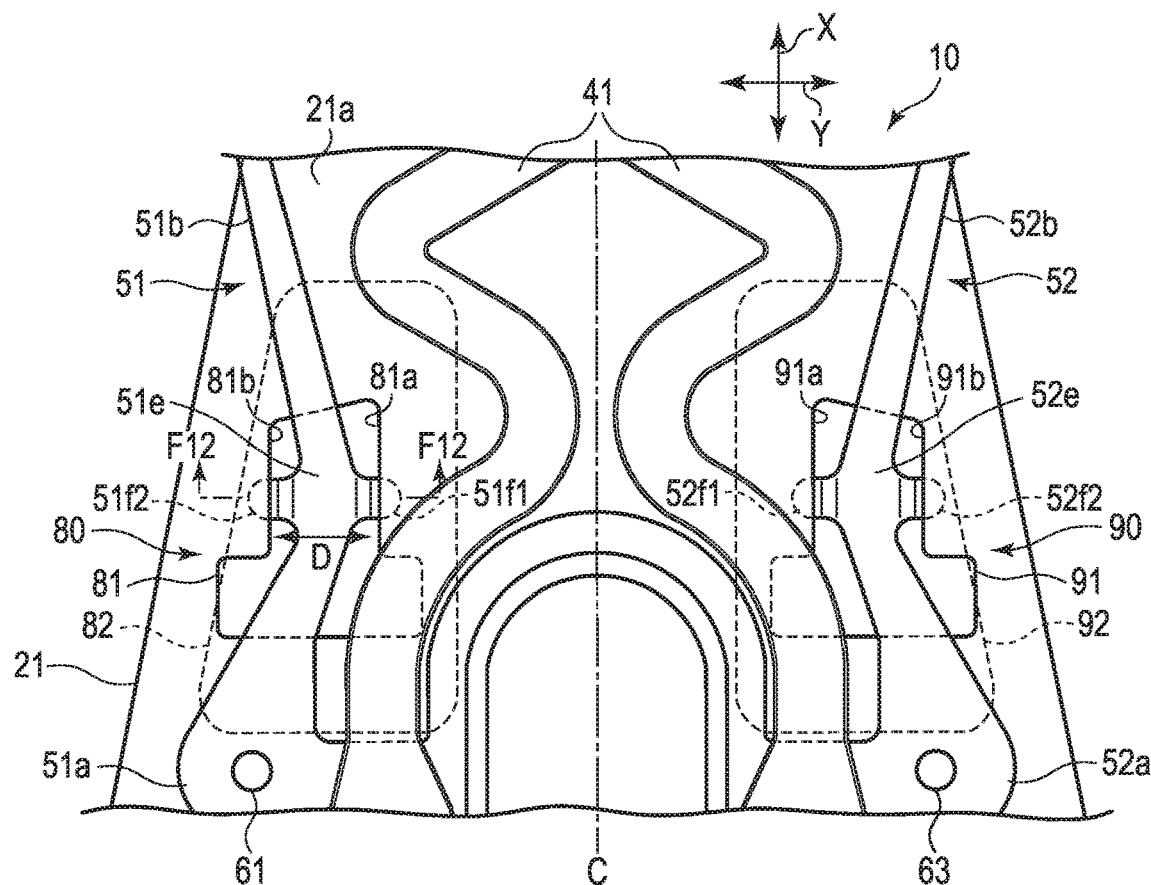
FIG. 11 is a plan view schematically showing a suspension of the second embodiment.

FIG. 11 is a plan view schematically showing a part of a suspension 10 of the second embodiment. In the suspension 10, a first proximal end-side arm 51*b* of a first outrigger 51 comprises a pair of branch portions 51*f* (51*f*1 and 51*f*2) which extend out from a first bent portion 51*e* in directions different from (opposite to) each other.

In the example shown in FIG. 11, first branch portions 51*f*1 and 51*f*2 extend to respective sides along the width direction Y. That is, the extending direction D of the first branch portions 51*f*1 and 51*f*2 is parallel to the width direction Y.

A first opening 81 comprises a pair of inner walls 81*a* and 81*b* parallel to the longitudinal direction X. The first branch portion 51*f*1 overlaps the inner wall 81*a*, and the first branch portion 51*f*2 overlaps the inner wall 81*b*. The first opening 81 has a shape that the inner walls 81*a* and 81*b* protrude inwards in the first opening 81. For example, when attaching a flexure 22 to a load beam 21, first, the first branch portions 51*f*1 and 51*f*2 are inserted to a wide region of the inner walls 81*a* and 81*b* shown in a lower portion of the figure and the flexure 22 is slid to an upper portion in the figure. Thus, the first branch portions 51*f*1 and 51*f*2 can be positioned at locations shown in FIG. 11, respectively.

Figure 12:
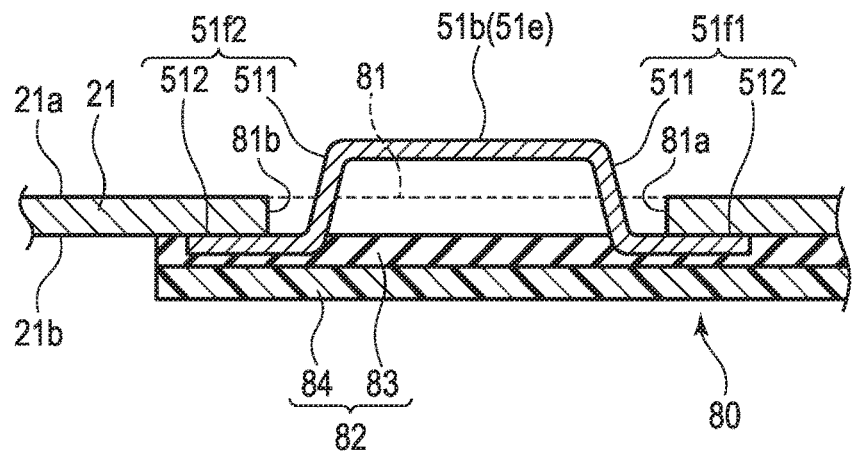
FIG. 12 is a schematic cross section of a first damping portion taken along line F12-F12 in FIG. 11.

FIG. 12 is a schematic cross section of a first damping portion 80 taken along line F12-F12 in FIG. 11. As in the case of the first embodiment, the first branch portions 51*f*1 and 51*f*2 each comprise a ramp portion 511 and a flat portion 512. The flat portions 512 of the first branch portion 51*f*1 and 51*f*2 each are interposed between the second surface 21*b* and the first damper member 82. More specifically, a viscoelastic material layer 83 is attached to a lower surface of each flat portion 512, as shown in FIG. 12, and an upper surface of each flat portion 512, as shown in FIG. 12, is pushed against the second surface 21*b*.

In the example shown in FIG. 11, the second proximal end-side arm 52*b* of the second outrigger 52, the second opening 91 and the second damper member 92 have a line-symmetrical shape with respect to the first proximal end-side arm 51*b*, the first opening 81 and the first damper member 82 with respect to the center C. That is, the second proximal end-side arm 52*b* includes a pair of second branch portions 52*f* (52*f*1 and 52*f*2) extending in directions different from each other, and the second opening 91 comprises a pair of inner walls 91*a* and 91*b*. The second branch portion 52*f*1 overlaps the inner wall 91*a* and the second branch portion 52*f*2 overlaps the inner wall 91*b*.

Further, the cross-sectional structure of the second damping portion 90 is similar to the cross-sectional structure of the first damping portion 80 shown in FIG. 11. That is, the second branch portions 52*f*1 and 52*f*2 each comprise a ramp portion and a flat portion, and each flat portion is interposed between the second surface 21*b* and the second damper member 92.

With the structure of this embodiment in which the outriggers 51 and 52 each include a pair of branch portions 51*f* and 52*f*, the outriggers 51 and 52 can be fixed in a well balanced manner in the respective sides along the width direction Y. Further, as compared to the case of the first embodiment, where the outriggers 51 and 52 are fixed to the branch portions 51*f* and 52*f*, respectively, one by one, a strong damping force (attenuating force) can be obtained.

Third Embodiment

Figure 13:
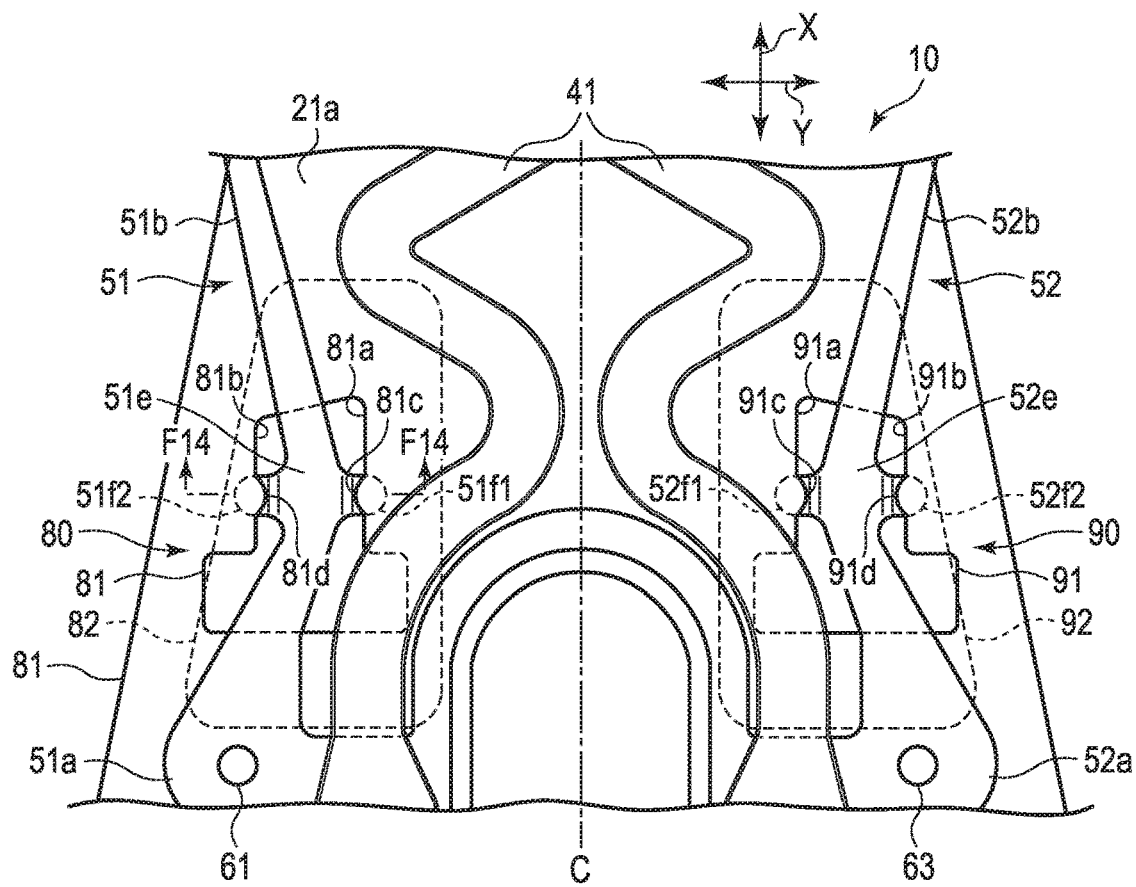
FIG. 13 is a plan view schematically showing a suspension of the third embodiment.

FIG. 13 is a plan view schematically showing a part of a suspension 10 of the third embodiment. The suspension 10 differs from that of the example of FIG. 11 in the shapes of the first opening 81 and the second opening 91.

That is, in the suspension 10 shown in FIG. 13, the first opening 81 comprises a pair of first projecting portions 81*c* and 81*d*. The first projecting portion 81*c* projects from an inner wall 81*a* in a position overlapping a first branch portion 51*f*1. The first projecting portion 81*d* projects from an inner wall 81*b* in a position overlapping a first branch portion 51*f*2.

Similarly, in the suspension 10 shown in FIG. 13, the second opening 91 comprises a pair of second projecting portions 91*c* and 91*d*. The second projecting portion 91*c* projects from an inner wall 91*a* in a position overlapping a second branch portion 52*f*1. The second projecting portion 91*d* projects from an inner wall 91*b* in a position overlapping a second branch portion 52*f*2.

In the example shown in FIG. 13, the projecting portions 81*c*, 81*d*, 91*c* and 91*d* are each arcuate. With this configuration, when attaching a flexure 22 to a load beam 21, the projecting portions 81*c*, 81*d*, 91*c* and 91*d* hardly interfere with branch portions 51*f*1, 51*f*2, 52*f*1 and 52*f*2. Note that the shape of each of the projecting portions 81*c*, 81*d*, 91*c* and 91*d* is not limited to arcuate, but may be some other shape such as rectangular or the like.

Figure 14:
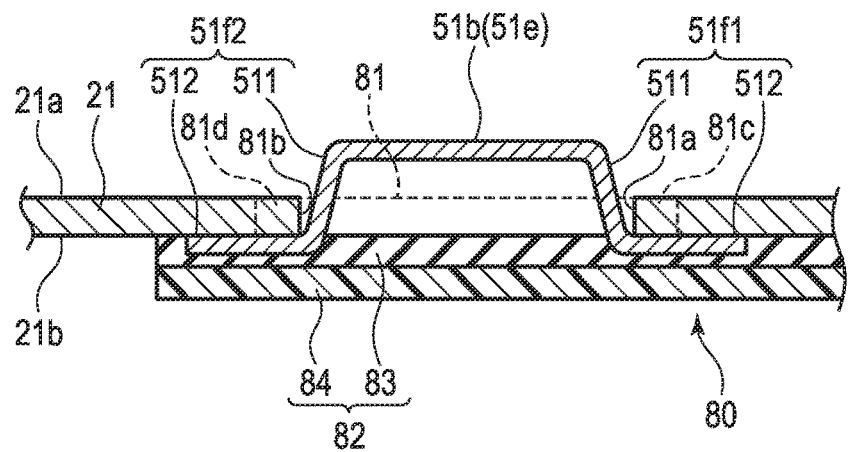
FIG. 14 is a schematic cross section of a first damping portion, taken along line F14-F14 in FIG. 13.

FIG. 14 is a schematic cross section of the first damping portion 80 taken along line F14-F14 in FIG. 13. The first projecting portion 81*c* extends towards a ramp portion 511 of the first branch portion 51*f*1. The first projecting portion 81*d* extends towards a ramp portion 511 of the first branch portion 51*f*2. With this configuration, as compared to the example of FIG. 12, the areas of the flat portions 512 of the first branch portion 51*f*1 and 51*f*2, interposed between the second surface 21*b* and the first damper member 82 are increased.

The cross-sectional structure of the second damping portion 90 is also similar to the cross-sectional structure of the first damping portion 80 shown in FIG. 14. That is, with the second projecting portions 91*c* and 91*d* thus provided, the areas of the flat portions of the second branch portions 52*f*1 and 52*f*2, interposed between the second surface 21*b* and the second damper member 92 are increased.

Thus, when the areas of the branch portions 51*f*1, 51*f*2, 52*f*1 and 52*f*2 interposed between the second surface 21*b* and the second damper member 92 are increased, the outriggers 51 and 52 are fixed better in the damping portions 80 and 90, thereby further improving the vibration damping force.

Note that the configuration of this embodiment, in which projecting portions are provided on inner sides of the openings 81 and 91, is also applicable similarly to the suspensions 10 of the first embodiment and the fourth to sixth embodiments, which will be described below.

Fourth Embodiment

FIG. 15 is a plan view schematically showing a part of a suspension 10 of the fourth embodiment. In the suspension 10, a first proximal end-side arm 51*b* of the first outrigger 51 comprises a first branch portion 51*f*, and a second proximal end-side arm 52*b* of the second outrigger 52 also comprises a second branch portion 52*f*.

In the example shown in FIG. 15, the extending direction D of the first branch portion 51*f* is parallel to the longitudinal direction X. An inner wall 81*a* of a first opening 81, which overlaps the first branch portion 51*f*, extends in a direction crossing the extending direction D, that is, for example, parallel to the width direction Y.

FIG. 16 is a schematic cross section of a first damping portion 80 taken along line F16-F16 in FIG. 15. As in the cases of the other embodiments described above, the first branch portion 51*f* comprises a ramp portion 511 and a flat portion 512, and the flat portion 512 is interposed between a second surface 21*b* and a first damper member 82.

In the example shown in FIG. 15, the second proximal end-side arm 52*b* of the second outrigger 52, the second opening 91 and the second damper member 92 has a line-symmetrical shape to the first proximal end-side arm 51*b*, the first opening 81 and the first damper member 82 with respect to the center C. Further, the cross-sectional structure of the second damping portion 90 is similar to the cross-sectional structure of the first damping portion 80 shown in FIG. 16.

As shown in FIG. 15, in this embodiment, the openings 81 and 91 do not comprise an inward protruding portion, unlike in the other embodiments. Even with such a configuration, the flexure 22 can be easily attached to the load beam 21. To explain, when the extending direction D of the branch portion 51*f* and 52*f* is parallel to the longitudinal direction X as in this embodiment, the branch portions 51*f* and 52*f* are inserted to the openings 81 and 91, respectively, and the flexure 22 is slid upwards as viewed in FIG. 15. In this manner, the branch portions 51*f* and 52*f* can be positioned to the respective locations shown in FIG. 15.

From another point of view, the openings 81 and 91 need not include a wide region to insert the branch portions 51*f* and 52*f*, unlike in the other embodiments described above. Therefore, the openings 81 and 91 can be downsized, and therefore the rigidity of the load beam 21 can be improved.

Fifth Embodiment

Figure 17:
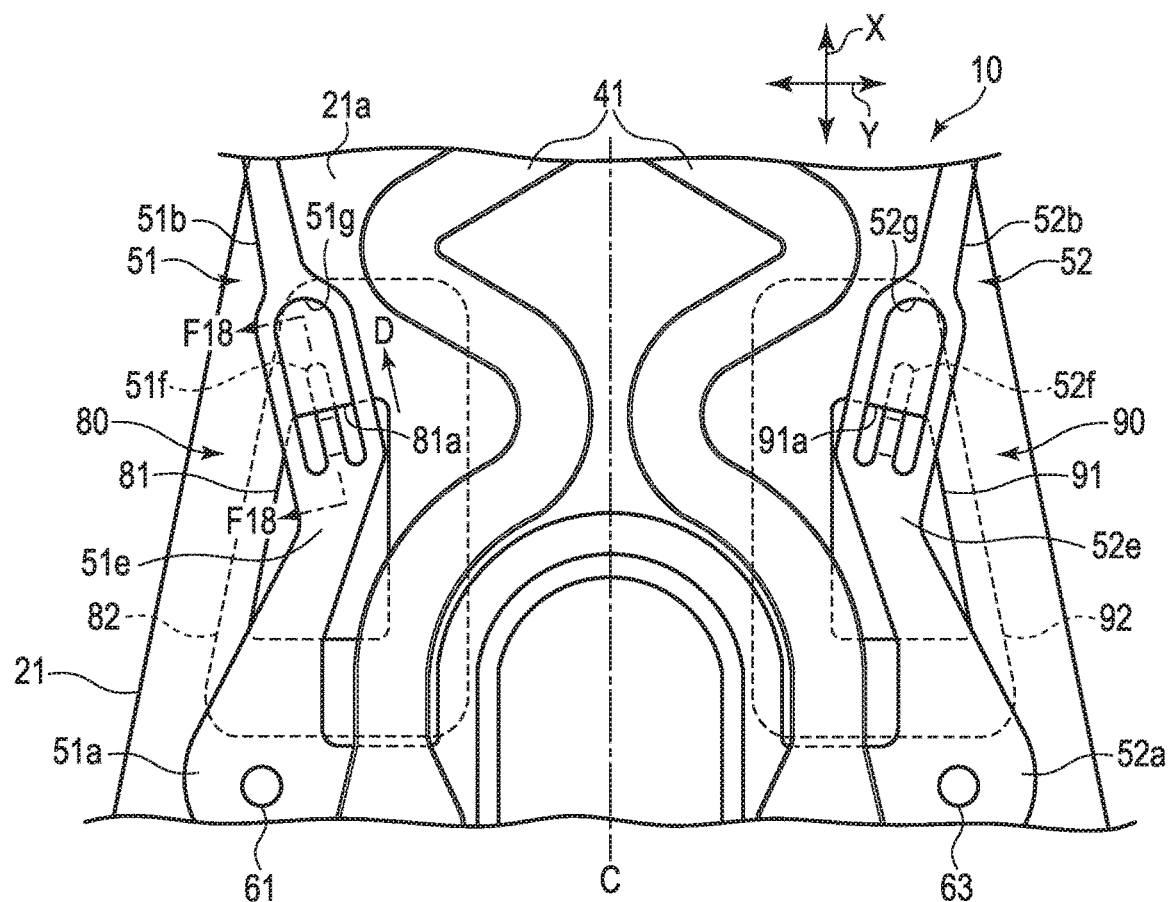
FIG. 17 is a plan view schematically showing a suspension of the fifth embodiment.

FIG. 17 is a plan view schematically showing a part of a suspension 10 of the fifth embodiment. In the suspension 10, a first proximal end-side arm 51*b* of the first outrigger 51 comprises a first arm opening 51*g*. The first arm opening 51*g* at least partially overlap the first opening 81. The first branch portion 51*f* is disposed inside the first arm opening 51*g*. It is preferable that the position of the first branch portion 51*f* placed in the first arm opening 51*g* be the center of the first proximal end-side arm 51*b* along the width direction.

In the example shown in FIG. 17, the extending direction D of the first branch portion 51*f* is inclined to both of the longitudinal direction X and the width direction Y. The inner wall 81*a* of the first opening 81, which overlaps the first branch portion 51*f* extends in a direction crossing each of the extending direction D, the longitudinal direction X and the width direction Y. The first arm opening 51*g* has a shape elongated along the extending direction D.

Figure 18:
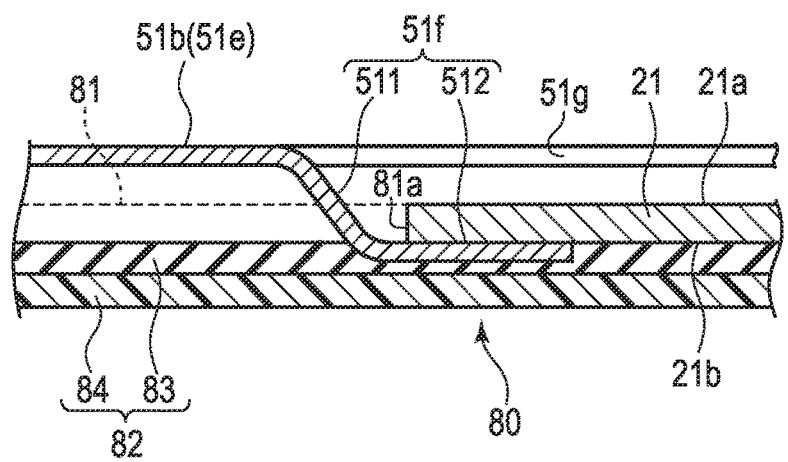
FIG. 18 is a schematic cross section of a first damping portion taken along line F18-F18 in FIG. 17.

FIG. 18 is a schematic cross section of the first damping portion 80 taken along line F18-F18 in FIG. 17. The first branch portion 51*f* comprises a ramp portion 511 and a flat portion 512 as in the case of the first embodiment. The flat portion 512 is interposed between second surface 21*b* and the first damper member 82. Note that the circumferential portion of the first arm opening 51*g* is not bent, but parallel to the first surface 21*a*.

In the example shown in FIG. 17, the second proximal end-side arm 52*b* of the second outrigger 52, the second opening 91 and the second damper member 92 has a line-symmetrical shape to the first proximal end-side arm 51*b*, the first opening 81 and the first damper member 82 with respect to the center C. That is, the second proximal end-side arm 52*b* comprises a second arm opening 52*g*, and the second branch portion 52*f* is disposed inside the second arm opening 52*g*. Further, the cross-sectional structure of the second damping portion 90 is similar to the cross-sectional structure of the first damping portion 80 shown in FIG. 18.

When the first branch portion 51*f* is provided inside the first arm opening 51*g* as in this embodiment, the first proximal end-side arm 51*b* can be fixed in a well balanced manner near the center along the width direction thereof. Similarly, when the second branch portion 52*f* is provided inside the second arm opening 52*g*, the second proximal end-side arm 52*b* can be fixed in a well balanced manner near the center along the width direction thereof.

Further, even with shapes of the openings 81 and 91 and the branch portion 51*f* and 52*f* shown in FIG. 17, the openings 81 and 91 need not include a wide region to insert the branch portions 51*f* and 52*f*, respectively, as in the case of the fourth embodiment. Thus, the openings 81 and 91 can be downsized and the rigidity of the load beam 21 can be improved.

Sixth Embodiment

Figure 19:
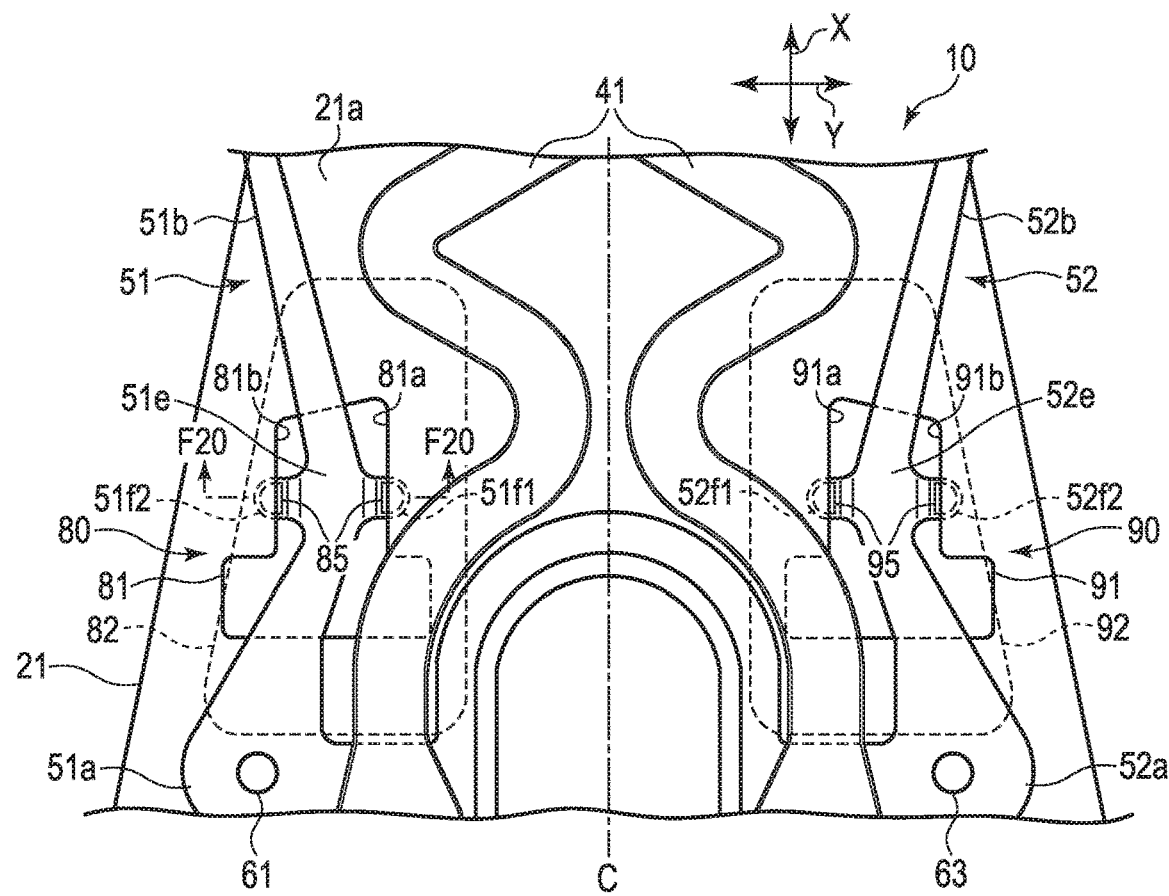
FIG. 19 is a plan view schematically showing a suspension of the sixth embodiment.

FIG. 19 is a plan view schematically showing a part of a suspension 10 of the sixth embodiment. The basic structure of the suspension 10 is similar to that of the example shown in FIG. 11. Note that the suspension 10 shown in FIG. 19 differs from that of the example of FIG. 11 in that the first damping portion 80 comprises a pair of first insulating layers 85 and the second damping portion 90 comprises a pair of second insulating layers 95. The pair of first insulating layers 85 overlap the first branch portions 51/1 and 51/2, respectively. The pair of second insulating layers 95 overlap the second branch portions 52/1 and 52/2, respectively.

Figure 20:
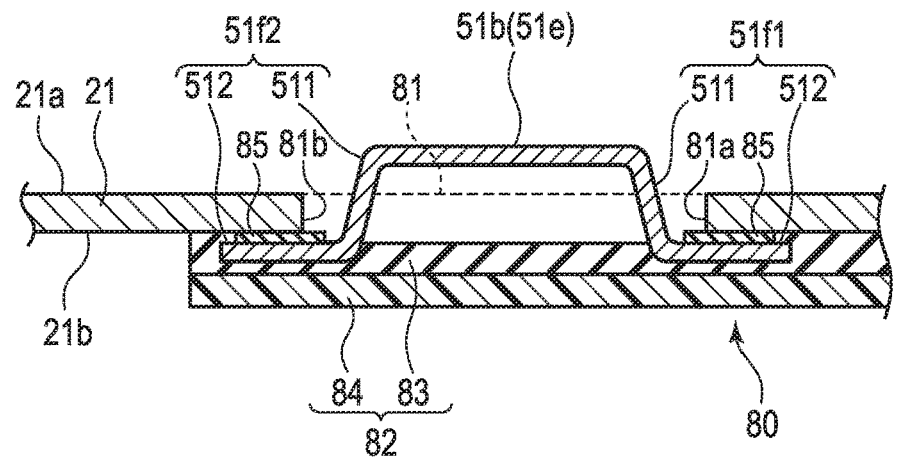
FIG. 20 is a schematic cross section of a first damping portion taken along line F20-F20 in FIG. 19.

FIG. 20 is a schematic cross section of the first damping portion 80 taken along line F20-F20 in FIG. 19. The first insulating layer 85 is formed on an upper surface (a surface opposing the second surface 21b) of each of the flat portions 512 of the first branch portions 51/1 and 51/2. The first insulating layer 85 does not reach the ramp portions 511 of the first branch portions 51/1 and 51/2.

The first insulating layer 85 is interposed between the respective flat portion 512 and the respective second surface 21b of the load beam 21. That is, in this embodiment, the flat portions 512 are not in contact with the respective second surfaces 21b. In the example shown in FIG. 20, the thickness of the first insulating layers 85 is less than the thickness of the load beam 21 or the flat portion 512. The first insulating layer 85 can be formed by, for example, applying polyimide onto the flat portions 512, followed by hardening, but the forming method is not limited to this example.

The cross-sectional structure of the second damping portion 90 is also similar to the cross-sectional structure of the first damping portion 80 shown in FIG. 20. That is, the second insulating layers 95 are formed on the flat portions of the second branch portions 52/1 and 52/2, respectively, and they are located between the flat portions and the second surfaces 21b, respectively.

The load beam 21 and the flexure 22 (the metal base 40) are all formed of a metallic material such as stainless steel or the like. With the configuration of this embodiment, in which the insulating layers 85 and 95 are respectively disposed between the branch portions 51/1, 51/2, 52/1 and 52/2 and the second surfaces 21b, the occurrence of abrasion and contamination, which may result when metal members rub against each other, can be suppressed.

Further, with such a configuration that the insulating layers 85 and 95 are formed so as not to reach the ramp portions of the branch portions 51/1, 51/2, 52/1 and 52/2, the bending process of the branch portions are not interfered with by the insulating layers 85 and 95.

Note that the configuration of this embodiment, in which the insulating layers 85 and 95 are provided, is also applicable similarly to the suspensions 10 of the other embodiments.

Note that when actually carrying out the invention disclosed in each of the above-discussed embodiments, specific modes such as the shapes of the load beams and flexures and the arrangement of the first damping portions and second damping portions, or the structural elements which constitute the disk device suspension can be changed in various ways. For example, a damper member in which a first damper member and a second damper member are coupled to each other as one piece may be used. Or, first damping portions and second damping portions similar to those of the embodiments may be provided for a suspension without the micro-actuator elements 65 and 66.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disk device, the suspension comprising:
   a load beam comprising a first surface, a second surface on an opposite side to the first surface, and a first opening and a second opening which penetrate from the first surface through to the second surface;
   a flexure comprising a tongue disposed along the first surface, on which a slider is mounted, and a first outrigger and a second outrigger disposed on respective outer sides of the tongue along a width direction thereof; and
   a first damper member and a second damper member, which are attached to the second surface,
   wherein:
   the first outrigger comprises a first arm disposed on a first surface side, and a first branch portion extending from the first arm through the first opening, a distal end of the first branch portion being interposed between the second surface and the first damper member, and
   the second outrigger comprises a second arm disposed on the first surface side, and a second branch portion extending from the second arm through the second opening, a distal end of the second branch portion being interposed between the second surface and the second damper member.

2. The suspension of claim 1, wherein:
   the first damper member at least partially closes the first opening and is attached on the second surface at a periphery of the first opening, and
   the second damper member at least partially closes the second opening and is attached on the second surface at a periphery of the second opening.

3. The suspension of claim 1, wherein:
   the first arm comprises a first bent portion overlapping the first opening,
   the second arm comprises a second bent portion overlapping the second opening,
   the first branch portion extends from the first bent portion, and
   the second branch portion extends from the second bent portion.

4. The suspension of claim 1, wherein the first branch portion and the second branch portion each extend in a direction crossing both a longitudinal direction and a width direction of the load beam.

5. The suspension of claim 1, wherein the first branch portion and the second branch portion each extend parallel to a longitudinal direction of the load beam.

6. The suspension of claim 1, wherein:
   the first branch portion comprises a pair of first branch portions which extend from the first arm in directions different from each other, and
   the second branch portion comprises a pair of second branch portions which extend from the second arm in directions different from each other.

7. The suspension of claim 1, wherein:
   the first opening comprises an inner wall including a first protrusion projecting towards the first branch portion inserted through the first opening, and
   the second opening comprises an inner wall including a second protrusion projecting towards the second branch portion inserted through the second opening.

8. The suspension of claim 1, wherein:
the first arm comprises a first arm opening at least partially overlapping the first opening,
the second arm comprises a second arm opening at least partially overlapping the second opening,
the first branch portion extends inwards in the first arm opening, and
the second branch portion extends inwards in the second arm opening.

9. The suspension of claim 1, further comprising:
a first insulating layer disposed between the distal end of the first branch portion and the second surface; and
a second insulating layer disposed between the distal end of the second branch portion and the second surface.

\* \* \* \* \*